US012766757B2

(12) United States Patent
Sun et al.

(10) Patent No.: US 12,766,757 B2
(45) Date of Patent: Oct. 20, 2026

(54) PREPARATION METHOD FOR VENEER MANUFACTURED BOARD

(71) Applicant: WANHUA CHEMICAL GROUP CO., LTD, Yantai (CN)

(72) Inventors: Weihua Sun, Yantai (CN); Song Tu, Yantai (CN); Liying Fan, Yantai (CN); Xiangshuo Wang, Yantai (CN); Peng Sun, Yantai (CN); Bingbo Hu, Yantai (CN); Xiangqian Xia, Yantai (CN)

(73) Assignee: WANHUA CHEMICAL GROUP CO., LTD, Yantai (CN)

( * ) Notice: Subject to any disclaimer, the term of this patent is extended or adjusted under 35 U.S.C. 154(b) by 331 days.

(21) Appl. No.: 18/687,387

(22) PCT Filed: Jun. 21, 2022

(86) PCT No.: PCT/CN2022/099991

§ 371 (c)(1),
(2) Date: Feb. 28, 2024

(87) PCT Pub. No.: WO2023/178856

PCT Pub. Date: Sep. 28, 2023

(65) Prior Publication Data

US 2024/0351236 A1 Oct. 24, 2024

(30) Foreign Application Priority Data

Mar. 25, 2022 (CN) ......................... 202210305025.7
May 13, 2022 (CN) ......................... 202210523604.9

(51) Int. Cl.
*B27D 1/08* (2006.01)
*C09J 5/02* (2006.01)
*C09J 5/06* (2006.01)
*C09J 175/08* (2006.01)

(52) U.S. Cl.
CPC *B27D 1/08* (2013.01); *C09J 5/02* (2013.01); *C09J 5/06* (2013.01); *C09J 175/08* (2013.01); *C09J 2400/306* (2013.01); *C09J 2475/00* (2013.01)

(58) Field of Classification Search
None
See application file for complete search history.

(56) References Cited

U.S. PATENT DOCUMENTS 5,063,010 A * 11/1991 Fischer .................... B27N 3/18 425/371
5,892,208 A * 4/1999 Harris ...................... B27D 3/00 219/696
6,022,444 A * 2/2000 Haider ................... C08G 18/10 524/13
6,054,081 A * 4/2000 Bielfeldt .................. B27N 3/18 264/109
6,402,877 B1 * 6/2002 Bielfeldt .................. B27D 3/04 156/266
6,572,804 B2 * 6/2003 Randall ..................... B27N 1/00 264/119
7,220,375 B2 * 5/2007 Haas ....................... B27N 3/086 264/102
2004/0170856 A1 * 9/2004 Arndell .................. B27M 3/006 156/331.4
2016/0361833 A1 * 12/2016 Wang ..................... B27N 3/203

FOREIGN PATENT DOCUMENTS

| | | | | | |
|---|---|---|---|---|---|
| CN | 101389675 | A | | 3/2009 | |
| CN | 101787253 | A | | 7/2010 | |
| CN | 103612292 | A | | 3/2014 | |
| CN | 110527056 | A | | 12/2019 | |
| CN | 111116854 | A | | 5/2020 | |
| CN | 111645164 | A | * | 9/2020 | ............... B27N 3/10 |
| CN | 112300734 | A | | 2/2021 | |

OTHER PUBLICATIONS

CN-111645164-A—machine translation (Year: 2020).*
Chinese Office Action , for CN Application No. 202210523604.9, 9 pages, dated Sep. 9, 2022.
PCT, International Search Report for PCT/CN2022/099991, 2 pages, dated Dec. 21, 2022.

* cited by examiner

*Primary Examiner* — Michael N Orlando
*Assistant Examiner* — Abhishek A Patwardhan
(74) *Attorney, Agent, or Firm* — Viksnins Harris Padys Malen LLP

(57) ABSTRACT

Disclosed herein is a method for efficiently producing formaldehyde-free veneer manufactured boards, comprising steps of: using wood or non-wood veneer as a raw material; controlling the moisture content of the veneer to within an appropriate range; first applying an accelerant and then applying an isocyanate adhesive; then assembling the veneer into a slab according to a certain rule; carrying out microwave preheating on the slab; and feeding the slab into a hot pressing mechanism to obtain aldehyde-free veneer manufactured boards. In the present method, the process for producing aldehyde-free veneer manufactured boards is simple and easy to implement, hot-pressing production efficiency is high, and the mechanical properties of the boards are excellent.

19 Claims, No Drawings

PREPARATION METHOD FOR VENEER MANUFACTURED BOARD

CROSS-REFERENCE TO RELATED APPLICATION(S)

This patent application claims the benefit of priority of Chinese Patent Application Nos. 202210305025.7, filed on Mar. 25, 2022, and 202210523604.9, filed on May 13, 2022.

TECHNICAL FIELD

Embodiments of the present application relate to the technical field of artificial panels, for example, a preparation method for formaldehyde-free veneer-based panel.

BACKGROUND

In recent years, as the environmental awareness of the public is increasing, formaldehyde-free panel has developed rapidly, major custom furniture companies have launched formaldehyde-free household products, and the formaldehyde-free panel has been rooted in heart of customers. At present, the adhesives used in the formaldehyde-free panel mainly comprises the isocyanate adhesive and biomass adhesive, etc., wherein the isocyanate adhesive has the highest market share. Isocyanate does not contain free formaldehyde, does not release VOCs, and has no obvious odor, which is green and environmentally friendly, and its curing product, polyurea, has high strength and good chemical stability, and is not easy to be degraded, and the prepared panel has good mechanical performance.

At present, the isocyanate adhesive used in artificial panels mainly is mostly PMDI (polymethylene polyphenyl polyisocyanate). CN101524857B discloses a method for preparing a formaldehyde-free veneer-based panel, which comprises applying PMDI by air spraying or airless spraying, and then performing blank assembling and hot pressing to obtain the formaldehyde-free veneer-based panel, where the hot pressing factor is 30-72 s/mm; however, the hot pressing production rate is low, and the hot pressing time is long when producing thick panels, for example, the shortest time required to produce a veneer-based panel with a thickness of 15 mm is 7.5 min. For CN105856343A, CN105773742A, CN105818225A and CN105856345A, ultrasonics and cyclone are used synergistically to atomizing PMDI for applying, only the applying method is optimized, the minimum hot pressing factor is 40 s/mm, and the hot pressing efficiency is still low.

Therefore, it is necessary to find a new preparation method for veneer-based panel to effectively improve the production efficiency of the formaldehyde-free panel.

SUMMARY

The following is a summary of the subject described in detail herein. This summary is not intended to limit the protection scope of the claims.

Embodiments of the present application provide a preparation method for veneer-based panel, and by applying an accelerator and subjecting the panel blank to microwave preheating, the hot pressing efficiency of the panel is improved, and thereby the production efficiency of the panel is improved.

A preparation method for veneer-based panel is provided, which comprises the following steps:

(1) applying an accelerator onto the surface of a veneer;

(2) applying an isocyanate adhesive onto the surface of the veneer treated in step (1);

(3) combining veneers treated in step (2) into a panel blank;

(4) preheating the panel blank obtained in step (3) by using microwave;

preferably, the microwave preheating is performed for a period of 10-300 s, and the center temperature of the panel blank after the microwave preheating is controlled at less than or equal to 90° C.; and (5) transferring the panel blank that reaches a target preheating temperature after the microwave preheating in step (4) into a heat press within 200 s, and subjecting the panel blank to hot-pressing molding at 120-250° C. with panel pressure of 0-1 MPa.

Preferably, in step (5), the hot pressing factor is controlled at 5-30 s/mm based on a thickness of the panel.

In some preferred embodiments of the present application, the veneer can be a wooden or non-wooden veneer, comprising but not limited to a eucalyptus veneer, a pine veneer, a poplar veneer, a birch veneer and a bamboo veneer, etc., and the moisture content of the veneer is controlled at 5-35%.

In some preferred embodiments of the present application, the accelerator is polyether containing polyethylene oxide segment.

Preferably, the polyether can be one or a combination of at least two of ethylene oxide-based polyether or ethylene oxide-co-propylene oxide-based polyether; the polyether can be used directly or can be added to a solvent (such as water) and prepared into a solution for use.

Preferably, the polyether has a functionality of more than or equal to 3, and a molecular mass of 200-6000, preferably 600-3000, the polyether is ethylene oxide-capped polyether, and the polyethylene oxide segment has a mass content of more than or equal to 50%, preferably more than 70%. The ethylene oxide-capped polyether contains primary hydroxyl, which has high reactivity with the isocyanate group (—NCO) contained in an isocyanate adhesive.

Preferably, the polyether has an unsaturation degree of 0.0005-0.002 mol/kg, preferably 0.0005-0.001 mol/kg.

Preferably, the accelerator has an applied amount of 5-300 $g/m^2$.

Preferably, polyhydroxy compound and amine compound could be used as the initiator for the polyether.

Preferably, an amine compound is used as the initiator for the polyether, and the polyether with an amine substance as an initiator contains a tertiary amine group, which can promote the reaction of hydroxyl, water and the isocyanate group, and the reactivity is high, so that the adhesive is cross-linked and cured rapidly by hot pressing, effectively improving the production efficiency of hot pressing.

In the present application, no additional catalyst is required, the ethylene oxide segment has hydrophilicity, and the propylene oxide segment has hydrophobicity, and the ethylene oxide segment must be more than or equal to 50% by mass in polyether to ensure that the polyether has a good hydrophilicity as a whole, which is conducive to the reaction of polyether, water and isocyanate, so that the adhesive can be cured quickly.

In the traditional production process, polyether polyol is usually obtained by using small molecule polyol as an initiator to initiate ring-opening polymerization of ethylene oxide and/or propylene oxide in the presence of a catalyst such as KOH. Because the catalyst such as KOH catalyzes the isomerization of epoxide monomers to generate allyl alcohol ($CH_2$═CH—$CH_2$—OH), and allyl alcohol competes with the initiation effect of the catalyst to cause a chain transfer reaction in which the active chain is transferred to the monomers, resulting in the generation of unsaturated monohydric alcohol with a low relative molecular mass, so that the polyether has a high unsaturation degree. The applicant found that when the preparation method of the present application is used to prepare an artificial panel, if the unsaturation degree of the accelerator polyether is high, there will be a negative impact on the bonding performance of the cured adhesive. The unsaturation degree of the ether substance of the related art is generally 0.01-0.12 mol/kg, and in order to guarantee the bonding strength in the present application, the unsaturation degree of the polyether used in the production process is required to be strictly controlled within the range of 0.0005-0.002 mol/kg.

With regard to the means of controlling the unsaturation degree, those skilled in the field can choose known means to reduce the unsaturation degree of polyether, such as controlling the usage amount of catalyst, selecting appropriate catalysts and controlling the reaction temperature, etc., to effectively reduce the unsaturation degree of the product.

In some preferred embodiments of the present application, a usage amount of the catalyst is controlled at 0.01-0.02% (a mass fraction of the catalyst), and a temperature of the reaction is controlled at 80-120° C.

Isocyanate adhesives are divided into aromatic polyisocyanate and aliphatic polyisocyanate (comprising alicyclic polyisocyanate) according to the structure characteristics of the connection between isocyanate groups and carbon atoms, and common types of isocyanates can all be used in the present application. Among them, the aromatic polyisocyanate, such as toluene diisocyanate (TDI), methylene diphenyl diisocyanate (MDI) and polymeric diphenylmethane diisocyanate (officially known as polymethylene polyphenyl polyisocyanate, also known as polymeric MDI or PMDI), etc., is relatively cheap. Therefore, in a preferred embodiment, the isocyanate is preferably aromatic polyisocyanate, further preferably one or more of toluene diisocyanate, methylene diphenyl diisocyanate and polymethylene polyphenyl polyisocyanate. A modified isocyanate product based on isocyanate, preferably PMDI or TDI or MDI or combinations thereof, can also be applied as an isocyanate adhesive in the present application. Preferably, the isocyanate adhesive contains methylene diphenyl diisocyanate with a mass content of 40-100 wt %. In the isocyanate adhesive, a certain amount of methylene diphenyl diisocyanate is conducive to reducing the viscosity of the isocyanate adhesive, and thus the isocyanate adhesive is more suitable for spraying when applied, and has higher reactivity and higher hot pressing curing rate. The modified isocyanate comprises but is not limited to polyether modification or polyester modification, and preferably, the isocyanate adhesive has a —NCO content of 20-34 wt %.

In some preferred embodiments of the present application, the isocyanate adhesive has an applied amount of 10-80 g/m$^2$.

Due to the high reactivity of polyether and isocyanate, if the two are mixed and then applied, the adhesive will be pre-cured, reducing the bonding strength and panel performance; if the isocyanate is first applied and then the accelerator is applied, because microwave pre-heating is performed before the hot pressing, isocyanate will excessively penetrate into the veneer base material, resulting in a lack of adhesive at the cementing interface, and also reducing the bonding strength and panel performance.

Because the rate of heat transfer inside the panel blank is low when the veneer-based panel is subjected to hot pressing, a long hot pressing period is required to ensure that the adhesive is fully cured and forms an effective bond and a qualified panel is obtained. In order to further improve the hot pressing efficiency, microwave is used to preheat the panel blank in the present application, so that the core of the panel blank can reach the curing temperature of the adhesive more quickly during the hot pressing, realizing rapid hot-pressing molding, and improving the production efficiency of panels. The principle of microwave heating is that under the action of external alternating electromagnetic field, the polar molecules (water, polyether and isocyanate) in the heated substance are polarized and alternate orientation with the polarity change of the external alternating electromagnetic field, and due to the frequent friction between polar molecules, electromagnetic energy is converted into heat energy, and the temperature of the base material is increased. It is worth noting that the temperature of the panel blank after microwave preheating should be controlled, because the microwave preheating is a non-contact method for preheating, the panel blank is not pressed during preheating, and the veneers cannot be tightly pressed with each other; if the temperature is too high after preheating, the polyether and isocyanate will be overly pre-cured, which cannot form an effective bond, reducing the bonding strength and panel performance.

Preferably, the veneers treated in step (2) are combined into a plywood blank according to an odd-numbered layer principle wherein adjacent veneers are oriented with their grain directions perpendicular to each other, or a plurality of veneers are combined into a laminated veneer lumber blank in the same grain direction.

The method of embodiments of the present application can be applied to the preparation of a veneer-based panel, especially to the preparation of a panel wherein the veneer has a thickness of more than or equal to 0.3 mm, especially more than or equal to 1 mm.

The beneficial effects of the embodiments of the present application are as follows.

(1) The embodiments of the present application provide a solution for improving the hot pressing production efficiency of the veneer-based panel: by adding an accelerator and performing microwave preheating, the isocyanate adhesive and accelerator can be guaranteed to be effectively combined, and the rapid curing of the adhesive and accelerator can effectively improve the hot pressing production efficiency of the veneer-based panel and reduce the hot pressing time, which are significantly improved compared with the related art.

(2) The method for improving the hot pressing production efficiency of the veneer-based panel provided in the embodiments of the present application has a specific process sequence: the accelerator must be applied first, and then the adhesive is applied and then microwave preheating is performed, such that the hot pressing production efficiency of the panel can be effectively improved, and the ideal effect cannot be achieved if the process sequence is changed or the process exceeds the range of conditions.

(3) In the embodiments of the present application further, by selecting polyether with a low unsaturation degree and high proportion of polyethylene oxide segment, the bonding strength of the polyether component and the cured isocyanate can be effectively improved and the bonding power of the panel can be improved, and the polyether flexible segment is introduced into the adhesive molecule, which can eliminate the internal stress of the adhesive, so that the panel has better dimensional stability; in the later stage, the veneer decoration of the panel does not reduce the performance of the base material.

(4) The solution for improving the hot pressing production efficiency of the veneer-based panel provided in the embodiments of the present application is simple and easy to implement, and has extremely high practicality.

DETAILED DESCRIPTION

The technical solutions of the present application are further described below in terms of the examples, but the present application is not limited to the examples; any other change known in the art shall be included within the scope to which protection is sought in the present application.

- Polymethylene polyphenyl polyisocyanate (PMDI): CW20, a proportion of methylene diphenyl diisocyanate is 40 wt %, Wanhua Chemical Group Co., LTD.;
- Coarse M: a proportion of methylene diphenyl diisocyanate is 55-60 wt %, Wanhua Chemical Group Co., LTD.;
- MDI100: a proportion of methylene diphenyl diisocyanate is 100 wt %, Wanhua Chemical Group Co., LTD.;
- MDI50: a proportion of methylene diphenyl diisocyanate is 100 wt %, Wanhua Chemical Group Co., LTD.;
- PM700: a proportion of methylene diphenyl diisocyanate is 25-30 wt %, Wanhua Chemical Group Co., LTD.;
- ethylene oxide-based polyether polyol A: a molecular mass of 1000, a functionality of 3, an EO unit end-capping, a mass fraction of an EO unit of 90.8% and an unsaturation degree of 0.0005 mol/kg;
- ethylene oxide-based polyether polyol B: a molecular mass of 6000, a functionality of 8, an EO unit end-capping, a mass fraction of an EO unit of 94.3% and an unsaturation degree of 0.0007 mol/kg;
- ethylene oxide-based polyether polyol C: a molecular mass of 200, a functionality of 3, an EO unit end-capping, a mass fraction of an EO unit of 54.5% and an unsaturation degree of 0.001 mol/kg;
- ethylene oxide-co-propylene oxide-based polyether D: a molecular mass of 3000, a functionality of 4, an EO unit end-capping, a mass fraction of an EO unit of 77.9% and an unsaturation degree of 0.0006 mol/kg;
- ethylene oxide-co-propylene oxide-based polyether E: a molecular mass of 1000, a functionality of 3, an EO unit end-capping, a mass fraction of an EO unit of 79.3% and an unsaturation degree of 0.002 mol/kg;
- ethylene oxide-based polyether polyol F: a molecular mass of 3000, a functionality of 3, an EO unit end-capping, a mass fraction of an EO unit of 96.9% and an unsaturation degree of 0.004 mol/kg;
- ethylene oxide-co-propylene oxide-based polyether polyol G: a molecular mass of 1000, a functionality of 3, an EO unit end-capping, a mass fraction of an EO unit of 44.2% and an unsaturation degree of 0.002 mol/kg;
- a metal-porphyrin complex catalyst $TPPH_2$-$Et_2AlCl$, Xi'an Qiyue Biotechnology Co., LTD.;
- an alkaline earth metal catalyst $Ba(OH)_2$*$8H_2O$, Shenyang Shisan Biochemical Technology Development Co., LTD.;
- diethylene glycol, Tianjin Kermel Chemical Reagent Co., LTD;
- potassium hydroxide, Shanghai Aladdin Biochemical Technology Co., LTD;
- an eucalyptus veneer with a moisture content of 20% and a thickness of 1.7 mm;
- an eucalyptus veneer with a moisture content of 5% and a thickness of 1.7 mm;
- an eucalyptus veneer with a moisture content of 35% and a thickness of 1.7 mm.

Example 1

Preparation of ethylene oxide-based polyether polyol A: glycerol, which was used as an initiator, and ethylene oxide were fed according to a molar ratio of 1:20.6, added with a metal-porphyrin complex catalyst of $TPPH_2$-$Et_2AlCl$ whose mass fraction was 0.01% of the above raw materials, and reacted at 90° C. for 105 h to prepare the ethylene oxide-based polyether polyol A.

An eucalyptus veneer with a moisture content of 20% was used as a base material; the accelerator of polyether polyol A and water were prepared into an aqueous solution according to a mass ratio of 1:4, and the accelerator aqueous solution was applied to the surface of the veneer by spraying, and an applied amount of the polyether polyol aqueous solution was 40 $g/m^2$; CW20 was applied to the surface of the veneer by spraying with an applied amount of 40 $g/m^2$; treated veneers were combined into a plywood panel blank having 9 layers according to an odd-numbered layer principle wherein adjacent veneers were oriented with their grain directions perpendicular to each other; the panel blank was preheated by microwave for 30 s, and a center temperature of the preheated panel blank was 70° C.; the panel blank was put into a hot press within 10 s and pressed with a hot pressing temperature of 160° C., a hot pressing pressure of 1 MPa in a high-pressure section, a hot pressing pressure of 0.1 MPa in a low-pressure section and a hot pressing factor of 15 s/mm, and a no-added formaldehyde plywood was obtained.

According to "LYT 1738-2020 Veneer-based Panel for Parquet", the obtained panels were subjected to Class I veneer-based panel performance test; according to "GBT 17657-2013 Test Methods of Evaluating the Properties of Wood-Based Panels and Surface Decorated Wood-Based Panels", the obtained panels were subjected to the formaldehyde emission test by climatic chamber method. The results are shown in Table 1.

Example 2

Preparation of ethylene oxide-based polyether polyol C: glycerol, which was used as an initiator, and ethylene oxide were fed according to a molar ratio of 1:2.5, added with an alkaline earth metal catalyst of $Ba(OH)_2$*$8H_2O$ whose mass fraction was 0.01% of the above raw materials and a co-catalyst diethylene glycol whose mass fraction was 0.01% of the above raw materials, and reacted at 80° C. for 105 h to prepare the ethylene oxide-based polyether polyol C.

An eucalyptus veneer with a moisture content of 35% was used as a base material; the accelerator of polyether polyol C was applied to the surface of the veneer by spraying with an applied amount of 5 $g/m^2$; CW20 was applied to the surface of the veneer by curtain coating with an applied amount of 80 $g/m^2$; treated veneers were combined into a plywood panel blank having 9 layers according to an odd-numbered layer principle wherein adjacent veneers were oriented with their grain directions perpendicular to each other; the panel blank was preheated by microwave for 90 s, and a center temperature of the preheated panel blank was 90° C.; the panel blank was immediately put into a hot press within 5 s and pressed with a hot pressing temperature of 250° C., a hot pressing pressure of 1 MPa in a high-pressure section, a hot pressing pressure of 0.1 MPa in a low-pressure section and a hot pressing factor of 5 s/mm, and a no-added formaldehyde plywood was obtained.

Test methods for panel performance and formaldehyde emission are the same as those of Example 1. The results are shown in Table 1.

Example 3

Preparation of ethylene oxide-based polyether polyol B: sucrose, which was used as an initiator, and ethylene oxide were fed according to a molar ratio of 1:128.3, added with $TPPH_2$-$Et_2AlCl$ whose mass fraction was 0.02% of the above raw materials, and reacted at 90° C. for 100 h to prepare the ethylene oxide-based polyether polyol B.

An eucalyptus veneer with a moisture content of 5% was used as a base material; the accelerator of polyether polyol B and water were prepared into an aqueous solution according to a mass ratio of 1:10, and the accelerator aqueous solution was applied to the surface of the veneer by curtain coating, and an applied amount of the polyether polyol aqueous solution was 300 g/m$^2$; CW20 was applied to the surface of the veneer by roll coating with an applied amount of 10 g/m$^2$; treated veneers were combined into a plywood panel blank having 9 layers according to an odd-numbered layer principle wherein adjacent veneers were oriented with their grain directions perpendicular to each other; the panel blank was preheated by microwave for 300 s, and a center temperature of the preheated panel blank was 60° C.; the panel blank was put into a hot press within 180-200 s and pressed with a hot pressing temperature of 120° C., a hot pressing pressure of 1 MPa in a high-pressure section, a hot pressing pressure of 0 MPa in a low-pressure section and a hot pressing factor of 30 s/mm, and a no-added formaldehyde plywood was obtained.

Test methods for panel performance and formaldehyde emission are the same as those of Example 1. The results are shown in Table 1.

Example 4

Preparation of ethylene oxide-co-propylene oxide-based polyether D: ethylenediamin, which was used as an initiator, and propylene oxide were fed according to a molar ratio of 1:10.4, added with catalyst $TPPH_2$-$Et_2AlCl$ whose mass fraction was 0.02% of the above raw materials, and reacted at 90° C. for 65 h, then added with ethylene oxide according to a molar ratio of ethylenediamine to ethylene oxide of 1:53, and continued to react at 90° C. for 40 h to prepare the ethylene oxide-co-propylene oxide-based polyether D.

An eucalyptus veneer with a moisture content of 20% was used as a base material; the accelerator D and water were prepared into an aqueous solution according to a mass ratio of 1:4, and the accelerator aqueous solution was applied to the surface of the veneer by spraying, and an applied amount of the polyether polyol aqueous solution was 70 g/m$^2$; CW20 was applied to the surface of the veneer by spraying with an applied amount of 30 g/m$^2$; treated veneers were combined into a plywood panel blank having 9 layers according to an odd-numbered layer principle wherein adjacent veneers were oriented with their grain directions perpendicular to each other; the panel blank was preheated by microwave for 10 s, and a center temperature of the preheated panel blank was 50° C.; the panel blank was put into a hot press within 60-70 s and pressed with a hot pressing temperature of 160° C., a hot pressing pressure of 1 MPa in a high-pressure section, a hot pressing pressure of 0.1 MPa in a low-pressure section and a hot pressing factor of 10 s/mm, and a no-added formaldehyde plywood was obtained.

Test methods for panel performance and formaldehyde emission are the same as those of Example 1. The results are shown in Table 1.

Example 5

Preparation of ethylene oxide-co-propylene oxide-based polyether E: triethanolamine, which was used as an initiator, and propylene oxide were fed according to a molar ratio of 1:1, added with $TPPH_2$-$Et_2AlCl$ whose mass fraction was 0.02% of the above raw materials, and reacted at 120° C. for 8 h, then added with ethylene oxide according to a molar ratio of triethanolamine to ethylene oxide of 1:18, and continued to react at 120° C. for 15 h to prepare the ethylene oxide-co-propylene oxide-based polyether E.

A no-added formaldehyde plywood was prepared by the same method as in Example 1 except that in this example, ethylene oxide-co-propylene oxide-based polyether E was used.

Example 6

Preparation of polyether polyol F: glycerol, which was used as an initiator, and ethylene oxide were fed according to a molar ratio of 1:66, added with KOH whose mass fraction was 0.02% of the above raw materials, and reacted at 120° C. for 25 h to prepare the polyether polyol F.

A no-added formaldehyde plywood was prepared by the same method as in Example 1 except that in this example, polyether polyol F was used.

Example 7

A no-added formaldehyde plywood was prepared by the same method as in Example 1 except that in this example, CW20 was replaced by coarse M.

Example 8

Preparation of low-viscosity isocyanate: CW20 and MDI100 were prepared into the low-viscosity isocyanate according to a mass ratio of 60:40, and a proportion of methylene diphenyl diisocyanate was 64 wt %.

A no-added formaldehyde plywood was prepared by the same method as in Example 1 except that in this example, CW20 was replaced by low-viscosity isocyanate.

Example 9

A no-added formaldehyde plywood was prepared by the same method as in Example 1 except that in this example, CW20 was replaced by MDI50.

Example 10

A no-added formaldehyde plywood was prepared by the same method as in Example 1 except that in this example, CW20 was replaced by PM700.

Comparative Example 1

No accelerator was applied; no microwave preheating was performed; a hot pressing factor was 30 s/mm, and other process conditions are the same as in Example 1.

Test methods for panel performance and formaldehyde emission are the same as those of Example 1. The results are shown in Table 1.

Comparative Example 2

No accelerator was applied; the microwave preheating was performed, and other process conditions are the same as in Example 1.

Test methods for panel performance and formaldehyde emission are the same as those of Example 1. The results are shown in Table 1.

Comparative Example 3

The accelerator was applied; no microwave preheating was performed, and other process conditions are the same as in Example 1.

Test methods for panel performance and formaldehyde emission are the same as those of Example 1. The results are shown in Table 1.

Comparative Example 4

CW20 was first applied and then the accelerator was applied, and other process conditions are the same as in Example 1.

Test methods for panel performance and formaldehyde emission are the same as those of Example 1. The results are shown in Table 1.

Comparative Example 5

Preparation of polyether polyol G: glycerol, which was used as an initiator, and propylene oxide were fed according to a molar ratio of 1:8, added with $TPPH_2$-$Et_2AlCl$ whose mass fraction was 0.02% of the above raw materials, and reacted at 90° C. for 75 h, then added with ethylene oxide according to a molar ratio of glycerol to ethylene oxide of 1:10, and continued to react at 90° C. for 30 h to prepare the polyether polyol G.

In this comparative example, polyether polyol G was used as an accelerator, and other process conditions are the same as in Example 1.

Test methods for panel performance and formaldehyde emission are the same as those of Example 1. The results are shown in Table 1.

Comparative Example 6

The accelerator was mixed with CW20 and then applied, and other process conditions are the same as in Example 1.

Test methods for panel performance and formaldehyde emission are the same as those of Example 1. The results are shown in Table 1.

Comparative Example 7

The microwave preheating was performed for 400 s, and a center temperature of the preheated panel blank was 95° C., and other process conditions are the same as in Example 1.

Test methods for panel performance and formaldehyde emission are the same as in Example 1. The results are shown in Table 1.

Comparative Example 8

The veneer used was tested for formaldehyde emission by climate chamber method, and the method is the same as in Example 1. The results are shown in Table 1.

TABLE 1

Summary of test results of veneer-based panel performance

| | Class I bonding strength MPa | Class I impregnation peeling | Dimensional stability % | Formaldehyde emission mg/m$^3$ |
|---|---|---|---|---|
| Example 1 | 1.36 | No peeling | 0.04 | 0.01 |
| Example 2 | 1.33 | No peeling | 0.03 | 0.01 |
| Example 3 | 1.34 | No peeling | 0.03 | 0.01 |
| Example 4 | 1.35 | No peeling | 0.04 | 0.01 |
| Example 5 | 1.31 | No peeling | 0.03 | 0.01 |
| Example 6 | 1.10 | No peeling | 0.06 | 0.01 |
| Example 7 | 1.25 | No peeling | 0.03 | 0.01 |
| Example 8 | 1.23 | No peeling | 0.04 | 0.01 |
| Example 9 | 1.22 | No peeling | 0.03 | 0.01 |
| Example 10 | 1.19 | No peeling | 0.03 | 0.01 |
| Comparative Example 1 | 0.88 | No peeling | 0.09 | 0.01 |
| Comparative Example 2 | 0.65 | Peeling | 0.09 | 0.01 |
| Comparative Example 3 | 0.62 | Peeling | 0.10 | 0.01 |
| Comparative Example 4 | 0.71 | Peeling | 0.09 | 0.01 |
| Comparative Example 5 | 0.74 | Peeling | 0.09 | 0.01 |
| Comparative Example 6 | 0.40 | Peeling | 0.09 | 0.01 |
| Comparative Example 7 | 0.60 | Peeling | 0.09 | 0.01 |
| Comparative Example 8 | — | — | — | 0.01 |

The test results of the panel performance in Examples 1-10 show that the mode of combining accelerator and microwave preheating can significantly improve the hot pressing production efficiency of the panel, and the panel performance is excellent; compared with the formaldehyde emission of the wood veneer in Comparative Example 8, the formaldehyde emission of the panel obtained by using the technical solution provided in the present application is comparable to that of the raw material veneer.

The results of Example 2 and Comparative Example 1 show that the mode of combining accelerator and microwave preheating can reduce the hot pressing factor of the plywood to 5 s/mm, and the production efficiency of the panel is 83% higher than that of Comparative Example 1 (the hot pressing factor is 30 s/mm, compared with the highest hot pressing efficiency in the present application).

The results of Example 1 and Comparative Examples 2-3 show that the effect of the technical solutions of the present application cannot be achieved by adopting either the accelerator or microwave preheating alone. The results of Example 1 and Comparative Example 4 show that the sequence of applying the accelerator and PMDI has a great impact on the bonding strength of the adhesive and the panel performance, and the panel performance is higher by applying the accelerator first and then PMDI. It can be seen from the comparison between Example 1 and Example 6 that the reduction of the unsaturation degree of polyether polyol is conducive to improving the strength of the adhesive and enhancing the dimensional stability. The results of Example 1 and Comparative Example 5 show that when the proportion of the EO segment in polyether is relatively low, the obtained panel performance is poor, because when the proportion of the EO segment is too low, the polyether will have inadequate hydrophilicity, which leads to a weak promotion effect on the reaction between water and isocyanate. The results of Example 1 and Comparative Example 6 show that the accelerator cannot be mixed with PMDI for microwave preheating because the adhesive can be pre-cured. The results of Example 1 and Comparative Example 7 show that the temperature of microwave preheating should not exceed 90° C., which otherwise will also cause the pre-curing of the adhesive.

Compared with the Example 10, Examples 7-9 has a high proportion of methylene diphenyl diisocyanate in the isocyanate adhesive, and compared with Example 10, the adhesive of Examples 7-9 has a lower viscosity, which is more conducive to spraying coating, and the reaction speed is fast, and the hot pressing curing speed is faster.

Finally, it is to be noted that the preceding examples are merely used for illustrating the preferred embodiments of the present application and are not to limit the scope of the present application. Although the present application has been described in detail with reference to preferred examples, it is to be understood by those of ordinary skill in the art that all variations or improvements made to the technical solutions of the present application because of modifications or equivalent substitutions shall fall within the protection scope defined by the claims of the present application.

What is claimed is:

1. A preparation method for a veneer-based panel, comprising the following steps:

(1) applying an accelerator onto the surface of a veneer;

(2) applying an isocyanate adhesive onto the surface of the veneer treated in step (1);

(3) combining veneers treated in step (2) into a panel blank;

(4) preheating the panel blank obtained in step (3) by using microwave; and (5) transferring the panel blank after the microwave preheating in step (4) into a heat press within 200 s, and subjecting the panel blank to hot-pressing molding;

wherein the accelerator is polyether containing polyethylene oxide segment;

wherein the polyether has a functionality of more than or equal to 3, and a molecular mass of 200-6000, and the polyether is ethylene oxide-capped polyether, and the polyethylene oxide segment has a mass content of more than or equal to 50%.

2. The preparation method according to claim 1, wherein the veneer is a wooden veneer or a non-wooden veneer, comprising a eucalyptus veneer, a pine veneer, a poplar veneer, a birch veneer and a bamboo veneer, and a moisture content of the veneer is controlled at 5-35%.

3. The preparation method according to claim 1, wherein the polyether is one or a combination of at least two of ethylene oxide-based polyether or ethylene oxide-co-propylene oxide-based polyether.

4. The preparation method according to claim 1, wherein the polyether has a functionality of more than or equal to 3, and a molecular mass of 600-3000, and the polyether is ethylene oxide-capped polyether, and the polyethylene oxide segment has a mass content of more than or equal to 70%.

5. The preparation method according to claim 1, wherein the polyether has an unsaturation degree of 0.0005-0.002 mol/kg.

6. The preparation method according to claim 1, wherein the accelerator has an applied amount of 5-300 $g/m^2$.

7. The preparation method according to claim 1, wherein a polyhydroxy compound and/or an amine compound is used as an initiator for the polyether.

8. The preparation method according to claim 1, wherein an amine compound is used as an initiator for the polyether.

9. The preparation method according to claim 1, wherein the isocyanate adhesive comprises one or more of aromatic polyisocyanate and aliphatic polyisocyanate.

10. The preparation method according to claim 1, wherein the isocyanate adhesive has a —NCO content of 20-34 wt %.

11. The preparation method according to claim 1, wherein the isocyanate adhesive has an applied amount of 10-80 $g/m^2$.

12. The preparation method according to claim 1, wherein the veneers treated in step (2) are combined into a plywood blank according to an odd-numbered layer principle wherein adjacent veneers are oriented with their grain directions perpendicular to each other, or a plurality of veneers are combined into a laminated veneer lumber blank in the same grain direction.

13. The preparation method according to claim 1, wherein in step (4), the microwave preheating is performed for a period of 10-300 s, and a center temperature of the panel blank after the microwave preheating is less than or equal to 90° C.

14. The preparation method according to claim 1, wherein a hot pressing factor in step (5) is controlled at 5-30 s/mm.

15. The preparation method according to claim 1, wherein the hot pressing in step (5) is performed at a temperature of 120-250° C. with panel pressure of 0-1 MPa.

16. The preparation method according to claim 9, wherein the isocyanate adhesive comprises aromatic polyisocyanate.

17. The preparation method according to claim 9, wherein the isocyanate adhesive comprises one or more of toluene diisocyanate, methylene diphenyl diisocyanate and polymethylene polyphenyl polyisocyanate.

18. The preparation method according to claim 9, wherein the isocyanate adhesive contains methylene diphenyl diisocyanate with a mass content of 40-100 wt %.

19. The preparation method according to claim 5, wherein the polyether has an unsaturation degree of 0.0005-0.001 mol/kg.

* * * * *